United States Patent
Jacobs, II

(10) Patent No.: US 10,545,481 B2
(45) Date of Patent: Jan. 28, 2020

(54) METHODS AND SOFTWARE FOR PROVIDING GRAPHICAL REPRESENTATIONS OF A PLURALITY OF OBJECTS IN A CENTRAL THROUGH OPENING

(71) Applicant: The Rapid Manufacturing Group LLC, Nashua, NH (US)

(72) Inventor: James L. Jacobs, II, Amherst, NH (US)

(73) Assignee: PROTO LABS INC, Maple Plain, MN (US)

(*) Notice: Subject to any disclaimer, the term of this patent is extended or adjusted under 35 U.S.C. 154(b) by 2 days.

(21) Appl. No.: 15/857,312

(22) Filed: Dec. 28, 2017

(65) Prior Publication Data

US 2018/0181107 A1 Jun. 28, 2018

Related U.S. Application Data

(60) Provisional application No. 62/439,596, filed on Dec. 28, 2016.

(51) Int. Cl.
G05B 19/4069 (2006.01)
G05B 19/4097 (2006.01)

(52) U.S. Cl.
CPC ..... *G05B 19/4069* (2013.01); *G05B 19/4097* (2013.01); *G05B 2219/50144* (2013.01)

(58) Field of Classification Search
CPC ............ G05B 19/4069; G05B 19/4097; G05B 2219/50144
See application file for complete search history.

(56) References Cited

U.S. PATENT DOCUMENTS 4,495,559 A 1/1985 Gelatt, Jr. et al.
5,117,354 A 5/1992 Long
(Continued)

FOREIGN PATENT DOCUMENTS

CN 2112190 U 8/1992
WO 154476 A2 8/2001
(Continued)

OTHER PUBLICATIONS

Defining Lead Time for APS Planning; http://t3.apptrix.com/syteline/Language/en-US/Other/Process/Defining_Lead_Time.htm [online][retrieved Mar. 31, 2017].
(Continued)

*Primary Examiner* — Abdelmoniem I Elamin
(74) *Attorney, Agent, or Firm* — Caldwell Intellectual Property Law

(57) ABSTRACT

Methods and software for generating machine-control instructions for controlling subtractive manufacturing equipment to form a plurality of objects from a single workpiece. In some embodiments, the machine-control instructions are for milling equipment that mills the objects from a single body of material by milling material from obverse and reverse sides of the body of material. Milling from the obverse side forms valleys in the obverse side and leaves interconnecting portions that connect together the plurality of objects. A removable fixating material is added to the valleys for holding the objects firmly in place relative to one another for milling from the reverse side. After the removable fixating material has hardened, milling from the reverse side removes the interconnecting portions. Milling operations from the obverse and reverse sides can include operations in addition to the forming of the valleys and removing of the interconnecting portions.

7 Claims, 8 Drawing Sheets

(56) References Cited

U.S. PATENT DOCUMENTS

| | | |
|---|---|---|
| 5,465,221 A | 11/1995 | Merat et al. |
| 5,495,430 A | 2/1996 | Matsunari et al. |
| 5,552,995 A | 9/1996 | Sebastian |
| 5,570,291 A | 10/1996 | Dudle et al. |
| 5,655,087 A | 8/1997 | Hino et al. |
| 5,758,328 A | 5/1998 | Giovannoli |
| 5,815,398 A * | 9/1998 | Dighe .................. G06Q 10/043 700/171 |
| 5,847,971 A | 12/1998 | Ladner et al. |
| 5,870,719 A | 2/1999 | Maritzen et al. |
| 5,937,189 A | 8/1999 | Branson et al. |
| 6,031,535 A | 2/2000 | Barton |
| 6,112,133 A | 8/2000 | Fishman |
| 6,240,332 B1 * | 5/2001 | Buttrick .................. G05B 19/04 700/169 |
| 6,295,513 B1 | 9/2001 | Thackston |
| 6,341,271 B1 | 1/2002 | Salvo et al. |
| 6,343,285 B1 | 1/2002 | Tanaka et al. |
| 6,611,725 B1 | 8/2003 | Harrison |
| 6,647,373 B1 | 11/2003 | Calton-Foss |
| 6,690,990 B1 * | 2/2004 | Caron ...................... B27G 1/00 144/363 |
| 6,701,200 B1 | 3/2004 | Lukis et al. |
| 6,750,864 B1 | 6/2004 | Anwar |
| 6,834,312 B2 | 12/2004 | Edwards et al. |
| 6,836,699 B2 | 12/2004 | Lukis et al. |
| 6,859,768 B1 | 2/2005 | Wakelam et al. |
| 6,922,701 B1 | 6/2005 | Ananian et al. |
| 6,917,847 B2 | 7/2005 | Littlejohn et al. |
| 7,006,084 B1 | 2/2006 | Buss et al. |
| 7,058,465 B2 | 6/2006 | Emori et al. |
| 7,079,990 B2 | 7/2006 | Haller et al. |
| 7,085,687 B2 | 8/2006 | Eckenwiler et al. |
| 7,089,082 B1 | 8/2006 | Lukis et al. |
| 7,123,986 B2 | 10/2006 | Lukis et al. |
| 7,134,096 B2 | 11/2006 | Brathwaite et al. |
| 7,299,101 B2 | 11/2007 | Lukis et al. |
| 7,305,367 B1 | 12/2007 | Hollis et al. |
| 7,327,869 B2 | 2/2008 | Boyer |
| 7,343,212 B1 | 3/2008 | Brearley et al. |
| 7,359,886 B2 | 4/2008 | Sakurai et al. |
| 7,366,643 B2 | 4/2008 | Verdura et al. |
| 7,369,970 B2 | 5/2008 | Shimizu et al. |
| 7,418,307 B2 | 8/2008 | Katircioglu |
| 7,467,074 B2 | 12/2008 | Faruque et al. |
| 7,496,487 B2 | 2/2009 | Wakelam et al. |
| 7,496,528 B2 | 2/2009 | Lukis et al. |
| 7,499,871 B1 | 3/2009 | McBrayer et al. |
| 7,523,411 B2 | 4/2009 | Carlin |
| 7,526,358 B2 | 4/2009 | Kawano et al. |
| 7,529,650 B2 | 5/2009 | Wakelam et al. |
| 7,565,139 B2 | 7/2009 | Neven, Sr. et al. |
| 7,565,223 B2 | 7/2009 | Moldenhauer et al. |
| 7,567,849 B1 | 7/2009 | Trammell et al. |
| 7,568,155 B1 | 7/2009 | Axe et al. |
| 7,571,166 B1 | 8/2009 | Davies et al. |
| 7,574,339 B2 | 8/2009 | Lukis et al. |
| 7,590,466 B2 | 9/2009 | Lukis et al. |
| 7,590,565 B2 | 9/2009 | Ward et al. |
| 7,603,191 B2 | 10/2009 | Gross |
| 7,606,628 B2 | 10/2009 | Azuma |
| 7,630,783 B2 | 12/2009 | Walls-Manning et al. |
| 7,656,402 B2 | 2/2010 | Abraham et al. |
| 7,689,936 B2 | 3/2010 | Rosel |
| 7,733,339 B2 | 6/2010 | Laning et al. |
| 7,747,469 B2 | 6/2010 | Hinman |
| 7,748,622 B2 | 7/2010 | Schon et al. |
| 7,761,319 B2 | 7/2010 | Gil et al. |
| 7,822,682 B2 | 10/2010 | Arnold et al. |
| 7,836,573 B2 | 11/2010 | Lukis et al. |
| 7,840,443 B2 | 11/2010 | Lukis et al. |
| 7,908,200 B2 | 3/2011 | Scott et al. |
| 7,957,830 B2 | 6/2011 | Lukis et al. |
| 7,979,313 B1 | 7/2011 | Baar |
| 7,993,140 B2 | 8/2011 | Sakezles |
| 8,000,987 B2 | 8/2011 | Hickey et al. |
| 8,024,207 B2 | 9/2011 | Ouimet |
| 8,140,401 B2 | 3/2012 | Lukis et al. |
| 8,170,946 B2 | 5/2012 | Blair et al. |
| 8,175,933 B2 | 5/2012 | Cook, Jr. et al. |
| 8,180,396 B2 | 5/2012 | Athsani et al. |
| 8,209,327 B2 | 6/2012 | Danish et al. |
| 8,239,284 B2 | 8/2012 | Lukis et al. |
| 8,249,329 B2 | 8/2012 | Silver |
| 8,271,118 B2 | 9/2012 | Pietsch et al. |
| 8,275,583 B2 | 9/2012 | Devarajan et al. |
| 8,295,971 B2 | 10/2012 | Krantz |
| 8,417,478 B2 | 4/2013 | Gintis et al. |
| 8,441,502 B2 | 5/2013 | Reghetti et al. |
| 8,515,820 B2 | 8/2013 | Lopez et al. |
| 8,554,250 B2 | 10/2013 | Linaker |
| 8,571,298 B2 | 10/2013 | McQueen et al. |
| 8,595,171 B2 | 11/2013 | Qu |
| 8,700,185 B2 | 4/2014 | Yucel et al. |
| 8,706,607 B2 | 4/2014 | Sheth et al. |
| 8,768,651 B2 | 7/2014 | Bhaskaran et al. |
| 8,798,324 B2 | 8/2014 | Conradt |
| 8,806,398 B2 | 8/2014 | Brathwaite et al. |
| 8,830,267 B2 | 9/2014 | Brackney |
| 8,849,636 B2 | 9/2014 | Becker et al. |
| 8,861,005 B2 | 10/2014 | Grosz |
| 8,874,413 B2 | 10/2014 | Mulligan et al. |
| 8,923,650 B2 | 12/2014 | Wexler |
| 8,977,558 B2 | 3/2015 | Nielsen et al. |
| 9,037,692 B2 | 5/2015 | Ferris |
| 9,055,120 B1 | 6/2015 | Firman |
| 9,060,831 B2 * | 6/2015 | Guggenmos ....... A61C 13/0022 |
| 9,106,764 B2 | 8/2015 | Chan et al. |
| 9,873,798 B2 * | 1/2018 | O'Brien .................. C09D 4/00 |
| 10,073,439 B1 * | 9/2018 | Jacobs, II .......... G05B 19/4097 |
| 10,235,009 B1 * | 3/2019 | Jacobs, II ........... G06F 3/04815 |
| 2001/0023418 A1 | 9/2001 | Suzuki et al. |
| 2001/0047251 A1 | 11/2001 | Kemp |
| 2002/0065790 A1 | 5/2002 | Oouchi |
| 2002/0087440 A1 | 7/2002 | Blair et al. |
| 2002/0099579 A1 | 7/2002 | Stowell et al. |
| 2002/0107673 A1 | 8/2002 | Haller et al. |
| 2002/0152133 A1 | 10/2002 | King et al. |
| 2003/0018490 A1 | 1/2003 | Magers et al. |
| 2003/0069824 A1 | 4/2003 | Menninger |
| 2003/0078846 A1 | 4/2003 | Burk et al. |
| 2003/0139995 A1 | 7/2003 | Farley |
| 2003/0149500 A1 | 8/2003 | Faruque et al. |
| 2003/0163212 A1 | 8/2003 | Smith et al. |
| 2003/0172008 A1 | 9/2003 | Hage et al. |
| 2003/0212610 A1 | 11/2003 | Duffy et al. |
| 2003/0220911 A1 | 11/2003 | Tompras |
| 2004/0008876 A1 | 1/2004 | Lure |
| 2004/0113945 A1 | 6/2004 | Park et al. |
| 2004/0195224 A1 | 10/2004 | Kanodia et al. |
| 2005/0055299 A1 | 3/2005 | Chambers et al. |
| 2005/0125092 A1 | 6/2005 | Lukis et al. |
| 2005/0144033 A1 | 6/2005 | Vreeke et al. |
| 2005/0171790 A1 | 8/2005 | Blackmon |
| 2005/0251478 A1 | 11/2005 | Yanavi |
| 2005/0273401 A1 | 12/2005 | Yeh et al. |
| 2006/0085322 A1 | 4/2006 | Crookshanks |
| 2006/0185275 A1 | 8/2006 | Yatt |
| 2006/0253214 A1 | 11/2006 | Gross |
| 2007/0016437 A1 | 1/2007 | Elmufdi et al. |
| 2007/0067146 A1 | 3/2007 | Devarajan et al. |
| 2007/0073593 A1 | 5/2007 | Perry et al. |
| 2007/0112635 A1 | 5/2007 | Loncaric |
| 2007/0198231 A1 | 8/2007 | Walch |
| 2008/0120086 A1 | 5/2008 | Lilley et al. |
| 2008/0120823 A1 * | 5/2008 | Lukis .................... B23Q 3/086 29/423 |
| 2008/0183614 A1 | 7/2008 | Gujral et al. |
| 2008/0269942 A1 | 10/2008 | Free |
| 2008/0281678 A1 | 11/2008 | Keuls et al. |
| 2009/0058860 A1 | 3/2009 | Fong et al. |
| 2009/0208773 A1 | 8/2009 | DuPont |
| 2009/0299799 A1 | 12/2009 | Racho et al. |
| 2009/0319388 A1 | 12/2009 | Yuan et al. |

(56) References Cited

U.S. PATENT DOCUMENTS

| | | | |
|---|---|---|---|
| 2010/0000677 A1* | 1/2010 | Guggenmos | A61C 13/0022 156/295 |
| 2011/0040542 A1 | 2/2011 | Sendhoff et al. | |
| 2011/0047140 A1 | 2/2011 | Free | |
| 2011/0209081 A1 | 8/2011 | Chen et al. | |
| 2011/0213757 A1 | 9/2011 | Bhaskaran et al. | |
| 2012/0016678 A1 | 1/2012 | Gruber et al. | |
| 2012/0072299 A1 | 3/2012 | Sampsell | |
| 2012/0230548 A1 | 9/2012 | Calman et al. | |
| 2012/0316667 A1 | 12/2012 | Hartloff | |
| 2013/0055126 A1 | 2/2013 | Jackson | |
| 2013/0097259 A1 | 4/2013 | Li | |
| 2013/0100128 A1 | 4/2013 | Steedly et al. | |
| 2013/0138529 A1 | 5/2013 | Hou | |
| 2013/0144566 A1 | 6/2013 | De Biswas | |
| 2013/0166470 A1 | 6/2013 | Grala et al. | |
| 2013/0218961 A1 | 8/2013 | Ho | |
| 2013/0293580 A1 | 11/2013 | Spivack | |
| 2013/0297320 A1 | 11/2013 | Buser | |
| 2013/0297460 A1 | 11/2013 | Spivack | |
| 2013/0311914 A1 | 11/2013 | Daily | |
| 2013/0325410 A1 | 12/2013 | Jung et al. | |
| 2014/0042136 A1 | 2/2014 | Daniel et al. | |
| 2014/0067333 A1 | 3/2014 | Rodney et al. | |
| 2014/0075342 A1 | 3/2014 | Corlett | |
| 2014/0098094 A1 | 4/2014 | Neumann et al. | |
| 2014/0157579 A1 | 6/2014 | Chhabra et al. | |
| 2014/0207605 A1 | 7/2014 | Allin et al. | |
| 2014/0229316 A1 | 8/2014 | Brandon | |
| 2014/0279177 A1 | 9/2014 | Stump | |
| 2014/0379119 A1 | 12/2014 | Sciacchitano et al. | |
| 2015/0055085 A1 | 2/2015 | Fonte et al. | |
| 2015/0066189 A1 | 3/2015 | Mulligan et al. | |
| 2015/0127480 A1 | 5/2015 | Herrman et al. | |
| 2015/0234377 A1 | 8/2015 | Mizikovsky | |
| 2018/0150048 A1* | 5/2018 | Jacobs, II | G05B 19/19 |

FOREIGN PATENT DOCUMENTS

| | | | |
|---|---|---|---|
| WO | 171626 | A2 | 9/2001 |
| WO | 2001077781 | A2 | 10/2001 |
| WO | 2006086332 | A2 | 8/2006 |
| WO | 2007067248 | A2 | 6/2007 |
| WO | 2011139630 | A1 | 11/2011 |
| WO | 2011140646 | | 11/2011 |
| WO | 2013058764 | A1 | 4/2013 |
| WO | 2014152396 | A2 | 9/2014 |

OTHER PUBLICATIONS

"Quartiles." Mathisfun.com. Web. <https://www.mathsisfun.com/data/quartiles.html>. Archive. <https://web.archive.org/web/20170313183511/https://www.mathsisfun.com/data/quartiles.html> [online] [retrieved Mar. 31, 2017].
Wu et al. Interactive 3D Geometric Modelers with 2D UI, 2002, State University of Campinas, www.dca.fee.unicamp.br, Sao Paulo, Brazil; 2002, 8 pages.
"Upload Your Photos, Print a 3D Model with hypr3D." SolidSmack. http://www.solidsmack.com/cad-design-news/hypr3d-photo-video-3d-print/; last accessed on Oct. 13, 2015.
"123D Catch." Autodesk. http://apps.123dapp.com/catch/ [online] [retrieved Mar. 31, 2017].
Rothganger et al. "3D Object Modeling and Recognition from Photographs and Image Sequences." Toward Category-Level Object Recognition. 2006, pp. 105-126, vol. 4170 of the series Lecture Notes in Computer Science. Springer Berlin Heidelberg.
Dealer Information Systems Corporation. "Parts Inventory." http://dis-corp.com/content/agriculture/inventory/parts-inventory. [online] [retrieved Mar. 31, 2017].
eMachineShop. "Emachineshop Features." http://www.emachineshop.com/machine-shop/Features/page518.html. [online] [retrieved Mar. 31, 2017].
Retrieved from:http://www.solidworks.com/sw/products/3d-cad/manufacturing-cost-estimation-quoting.htm p. 1: Automatic Manufacturing Cost Estimation Overview; Solidworks; 2015.
Retrieved from: http://www.gom.com/fileadmin/user_upload/industries/touch_probe_fixtures_EN.pdf; Application Example: Quality Control, Online Calibration and Validation of Fixtures, Jigs and Gauges. GOM mbH, 2008.
http://citeseerx.ist.psu.edu/viewdoc/download?doi=10.1.1.194.7785&rep=rep1&type=pdf Kim, Jin Baek, and Arie Segev. "A web services-enabled marketplace architecture for negotiation process management." Decision Support Systems 40.1 (2005): 71-87.
Jaiswal, Ashutosh et al., "Design and Implementation of a Secure Multi-Agent Marketplace", Elsevier Science, pp. 1-23, Jun. 3, 2004; http://magnet.cs.umn.edu/papers/Jaiswal04cera.pdf.
http://www.computer.org/csdl/proceedings/hicss/2005/2268/01/22680038.pdf Bui, Tung, and Alexandre Gachet. "Web services for negotiation and bargaining in electronic markets: Design requirements and implementation framework." System Sciences, 2005. HICSS'05. Proceedings of the 38th Annual Hawaii International Conference on. IEEE, 2005.
http://www.bridgelinedigital.com/File%20Library/Repository/eCommerce/Sample-eCommerce-RFP-Template_Bridgeline-Digital.pdf. Sample RFP Template: Ecommerce Platform, Bridgeline Digital, 2014.
Matchbook, Tealbook, http://www.matchbookinc.com/ Sep. 28, 2015.
3Diligent, Source Smarter, http://www.3diligent.com/customer.html; Sep. 28, 2015.
Dassault Systemes, Brochure, Mar. 24, 2010: New Features Type3ToCatia http://www.type3.us/content/download/2202/405535/file/New%20Feature_Type3ToCatia_2010_US%20old.pdf.
Xue, S., X. Y. Kou, and S. T. Tan. "Natural voice-enabled CAD: modeling via natural discourse." Computer-Aided Design and Applications 6.1 (2009): 125-136.
Kou, X. Y., S. K. Xue, and S. T. Tan. "Knowledge-guided inference for voice-enabled CAD." Computer-Aided Design 42.6 (2010): 545-557.
Sharma, Anirudh, et al. "MozArt: a multimodal interface for conceptual 3D modeling." Proceedings of the 13th international conference on multimodal interfaces. ACM, 2011.
Sorpas ("User Manual,", Swanted Software and Engineering Aps, 2011 (120 pages)).
Kalpakjian, S. and Schmid, S., *Manufacturing Processes for Engineering Materials*, $5^{th}$ Ed. Pearson (Jul. 27, 2007).
Wang and Bourne, *Design and Manufacturing of Sheet Metal Parts: Using Features to Aid Process Planning and Resolve Manufacturability Problems*, Robotics and Computer-Integrated Manufacturing, vol. 13, No. 3, pp. 281-294 (1997).
U.S. Appl. No. 14/267,447, Aug. 5, 2015, Office Action.
U.S. Appl. No. 14/197,922, Nov. 26, 2014, Office Action.
U.S. Appl. No. 14/197,922, Apr. 27, 2015, Response to Office Action.
U.S. Appl. No. 14/197,922, May 15, 2015, Office Action.
U.S. Appl. No. 14/267,447, Jun. 18, 2015, Response to Office Action.
U.S. Appl. No. 14/263,665, Oct. 8, 2015, Office Action.
U.S. Appl. No. 14/053,222, Jan. 29, 2016, Office Action, U.S. Pat. No. 9,606,701.
U.S. Appl. No. 14/311,943, Apr. 27, 2016, Office Action.
U.S. Appl. No. 14/486,550, May 26, 2016, Office Action.
U.S. Appl. No. 14/060,033, Jun. 15, 2016, Office Action.
U.S. Appl. No. 14/172,462, Jul. 6, 2016, Office Action.
U.S. Appl. No. 14/053,222, Jul. 29, 2016, Response to Office Action.
U.S. Appl. No. 14/185,204, Jul. 29, 2016, Office Action.
U.S. Appl. No. 14/062,947, Sep. 16, 2016, Office Action.
U.S. Appl. No. 14/457,758, Sep. 30, 2016, Office Action.
U.S. Appl. No. 14/457,758, Mar. 29, 2017, Response to Office Action.
U.S. Appl. No. 14/195,391, Oct. 18, 2017, Office Action.
U.S. Appl. No. 14/172,404, Oct. 20, 2017, Office Action.
U.S. Appl. No. 14/275,116, Dec. 28, 2016, Office Action.
U.S. Appl. No. 14/303,372, Jan. 11, 2017, Office Action.
U.S. Appl. No. 14/246,254, Jan. 11, 2017, Office Action.

(56) References Cited

OTHER PUBLICATIONS

U.S. Appl. No. 14/229,008, Jan. 13, 2017, Office Action.
U.S. Appl. No. 14/060,033, filed Oct. 22, 2013.
U.S. Appl. No. 14/053,222, Oct. 14, 2013, U.S. Pat. No. 9,606,701.
U.S. Appl. No. 14/172,462, filed Oct. 16, 2013.
U.S. Appl. No. 14/062,947, filed Oct. 25, 2013.
U.S. Appl. No. 14/172,404, filed Feb. 4, 2014.
U.S. Appl. No. 14/303,372, filed Jun. 12, 2014.
U.S. Appl. No. 14/185,204, filed Feb. 20, 2014.
U.S. Appl. No. 14/195,391, filed Mar. 3, 2014.
U.S. Appl. No. 14/246,254, filed Apr. 7, 2014.
U.S. Appl. No. 14/229,008, filed Mar. 28, 2014.
U.S. Appl. No. 14/197,922, filed Mar. 5, 2014.
U.S. Appl. No. 14/263,665, filed Apr. 28, 2014.
U.S. Appl. No. 14/267,447, filed May 1, 2014.
U.S. Appl. No. 14/311,943, filed Jun. 23, 2014.

* cited by examiner

200

METHODS AND SOFTWARE FOR PROVIDING GRAPHICAL REPRESENTATIONS OF A PLURALITY OF OBJECTS IN A CENTRAL THROUGH OPENING

RELATED APPLICATION DATA

This application claims the benefit of priority of U.S. Provisional Patent Application Ser. No. 62/439,596, filed on Dec. 28, 2016, and titled "METHODS AND SOFTWARE FOR PROVIDING GRAPHICAL REPRESENTATIONS OF A PLURALITY OF OBJECTS IN A CENTRAL THROUGH OPENING," which is incorporated by reference herein in its entirety.

FIELD OF THE INVENTION

The present invention generally relates to the field of machining. In particular, the present invention is directed to methods and software for providing graphical representations of a plurality of objects in a central through opening.

BACKGROUND

Many types of objects are manufactured using rotary-tool milling and other types of subtractive manufacturing processes. Typically, a single object is made from a single body of material, or "workpiece," such as a block or slab of steel or aluminum. For example, steel and aluminum parts for any of a wide variety of assemblies are often machined from individual workpieces using one or more milling machines. However, making such machined parts can be labor intensive as operators load and unload individual workpieces to and from milling machines.

SUMMARY OF THE DISCLOSURE

In one aspect, a method of locating graphical representations of a plurality of objects in a central through opening is disclosed. The method includes generating a workpiece computer model of a workpiece. Generating a workpiece computer model of a workpiece includes receiving a graphical representation of a temporary support frame with dimensions corresponding to dimensions of a body of material to be machined from the body of material, wherein the graphical representation of the temporary support frame includes first and second faces spaced from one another and a central through-opening for receiving graphical representations of computer models of the plurality of objects, the through-opening extending from the first side to the second side. Generating a workpiece computer model further includes receiving a selection of the graphical representations of the plurality of objects to be machined from the body of material. Generating the workpiece computer model further includes locating the graphical representations of the plurality of objects in the central through-opening so that the graphical representations of the plurality of objects are spaced from one another and from the graphical representation of the temporary support frame by a network of through-spaces so as to permit separating of the plurality of objects by machining of the body of material by the machining equipment.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
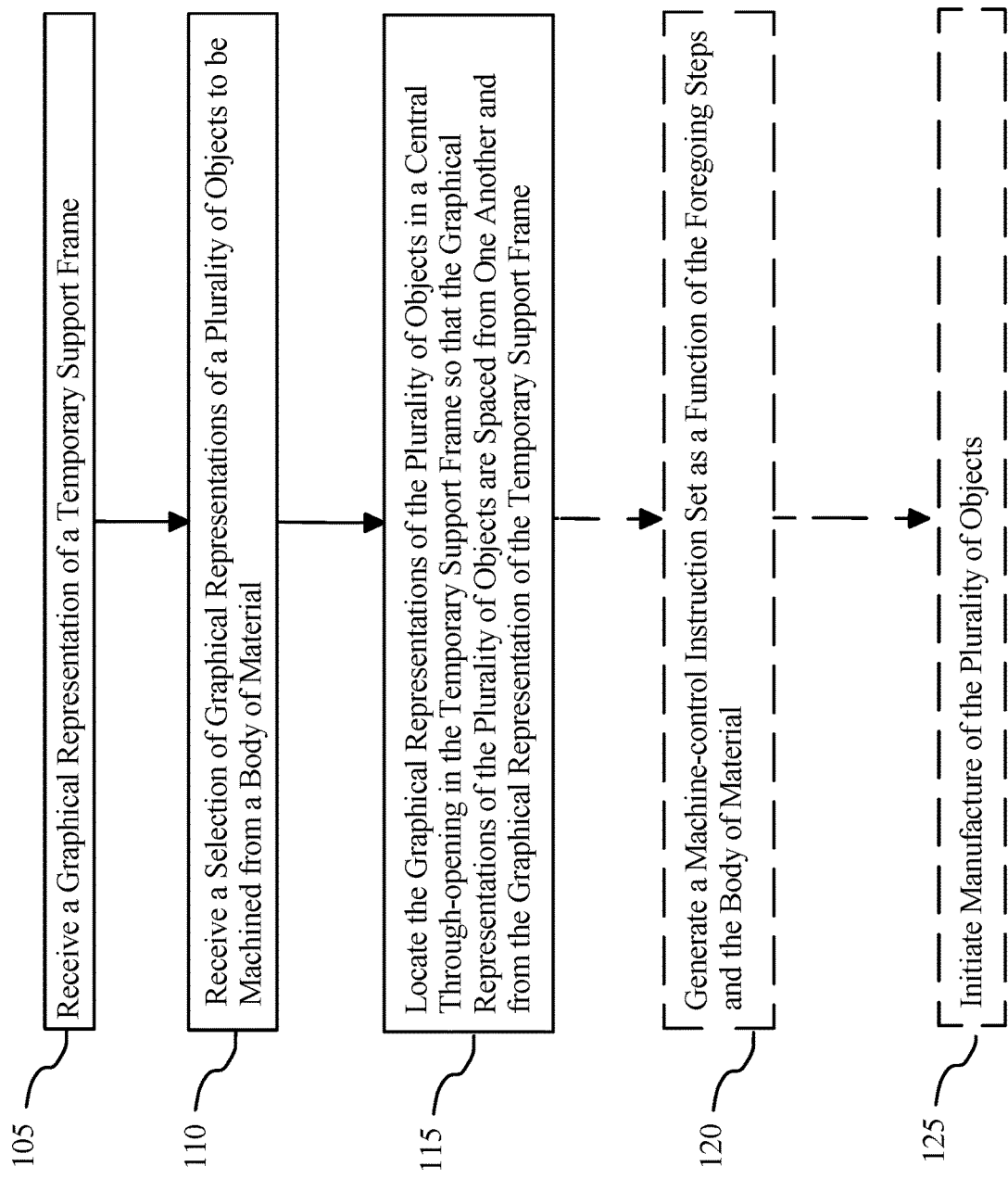
FIG. 1 is a flow diagram of an exemplary method of generating a machine-control instruction set for machining a plurality of objects from a single workpiece.

In one aspect, the present invention is directed to methods of providing graphical representations of a plurality of objects in a central through opening. Methods for providing machine-control instruction sets for controlling machining equipment during manufacturing of a plurality of discrete objects from a single body of material, or "workpiece," using a temporary fixating material to firmly hold the discrete objects in place while they are being disconnected or partially disconnected from one another using one or more machining processes are also disclosed. As described below in detail, in these methods a temporary support frame is provided, for example, to aid in: handling; datum referencing; and/or object layout, among other things. Examples of discrete objects that can be manufactured using techniques disclosed herein include, but are not limited to, finished parts for assemblies (such as consumer products, military equipment, commercial equipment, among others), precursors to finished parts (such as precursors that required further processing to create finished assembly parts), finished standalone products, and precursors to finished standalone products, among others. Generally, the only limitations on the nature and character of the discrete objects is that they are manufacturable or partially manufacturable by one or more subtractive manufacturing processes and are compatible with other steps of processes described below, such as with the processes of installing and removing of a removable fixating material used to temporarily fix the discrete parts relative to one another and/or relative to the temporary peripheral frame. It is noted that for any given body of material, the multiple discrete parts may all be identical to one another or they may all be different from one another or some may be identical and others may be different. As used herein and in the appended claims, a "precursor" to a finished part or finished object is a discrete object, i.e., an object liberated from the body of material from which it is made, that requires further processing to become the finished part or finished object.

Examples of bodies of material from which the multiple discrete objects can be made include, but are not limited to, plates, slabs, blooms, billets, boards, blocks, among many other shapes, including curvilinear and multisided shapes, and any combination thereof. As for the material composing the body, the material may be any suitable material, such as metal (solid, sintered, etc.), polymer (solid, foamed, etc.), wood, composite, and multilayer and/or multi-material material, among others. Fundamentally, there is no limitation on the composition of the body of material other than it be compatible with the selected subtractive manufacturing process(es) and the removable fixating material and its removal technique(s).

Each machining process used may be any suitable process, such as, but not limited to, rotary-tool milling, electronic discharge machining, ablation, etching, erosion, cutting, and cleaving, among others. Fundamentally, there is no limitation on the type of subtractive manufacturing process(es) used other than each is compatible with composition of the body of material and/or the fixating material, depending on when a particular subtractive manufacturing process is used in the overall method. For example, differing subtractive manufacturing processes can be used before and after the fixating material has been installed, such that the subtractive machining process used prior to installing the fixating material does not need to be compatible with the fixating material, whereas each subtractive manufacturing process after the fixating material has been installed may need to be compatible with the fixating material, for example, if it is used to remove any of the fixating material, incidentally or intentionally.

If rotary-tool milling is utilized, this milling may be accomplished using any suitable type of milling equipment, such as milling equipment having either a vertically or horizontally oriented spindle shaft. Examples of milling equipment include bed mills, turret mills, C-frame mills, floor mills, gantry mills, knee mills, and ram-type mills, among others. In some embodiments, the milling equipment used for removing material may be of the computer numerical control (CNC) type that is automated and operates by precisely programmed commands that control movement of one or more parts of the equipment to effect the material removal. CNC machines, their operation, programming, and relation to computer aided manufacturing (CAM) tools and computer aided design (CAD) tools are well known and need not be described in detail herein for those skilled in the art to understand the scope of the present invention and how to practice it in any of its widely varying forms.

Methods disclosed herein include methods of providing machine-control instruction sets, for example, numerical control (NC) instructions sets, for controlling machining equipment to machine a plurality of objects from a single workpiece in an efficient manner. FIG. 1 illustrates a method 100 that is an example of such methods. As will be understood from reading this entire disclosure, aspects of some of the methods described herein, including method 100, may be performed by a workpiece-layout system that runs computer software, such as CAD and/or CAM software and software for generating machine-control instructions sets from CAD models and/or other types of computer models of objects to be fabricated using the machine-control instructions provided by these methods. Such a workpiece-layout system can comprise any suitable computing system, including standalone computing systems and networked computing system that can run conventional CAD software, CAM software, and the like. As alluded to above, the term "machine-control instructions" and like terms are used herein and in the appended claims to denote any instruction set needed to control any one or more types of machining equipment to perform the necessary machining and, as appropriate, any additional machine-control instructions for performing non-machining operations, such as controlling any robotic manipulator(s) and/or other equipment that automatically moves a workpiece before, during, or after machining operations.

Figure 2:
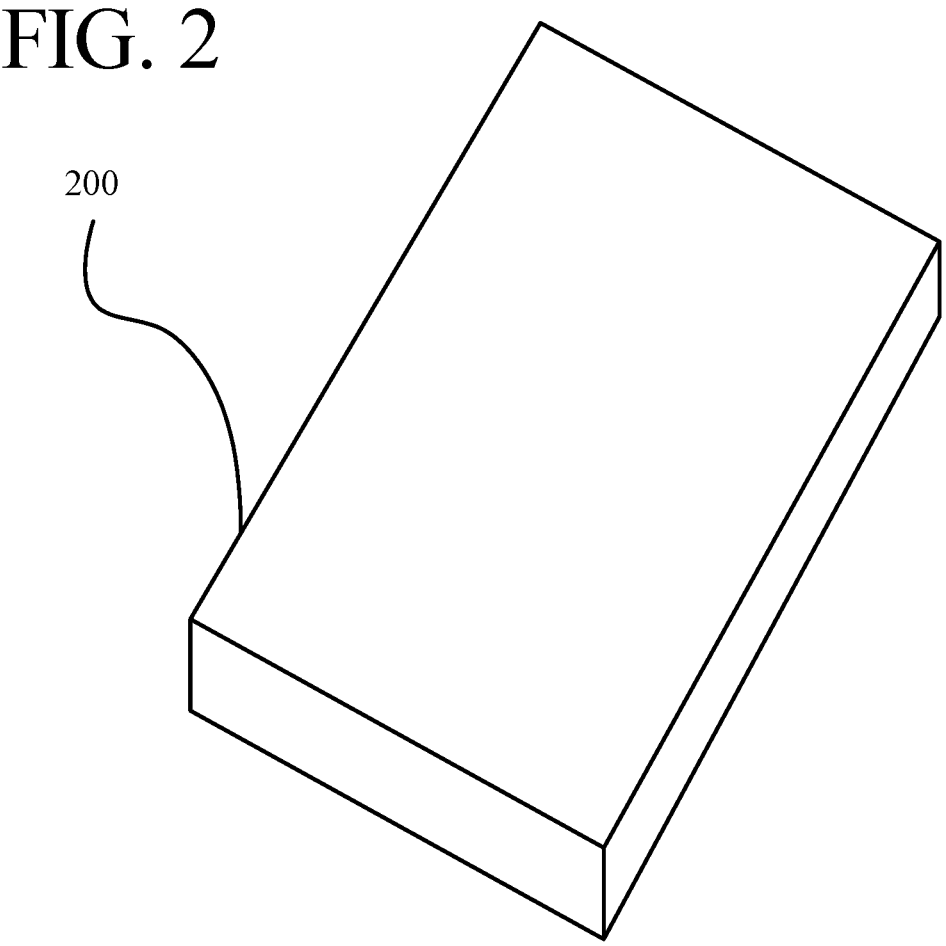
FIG. 2 is a perspective view of an exemplary body of material prior to forming a plurality of discrete objects from the body of material.

Before describing exemplary method 100, an exemplary double-sided machining scenario utilizing a slab of material 200, as illustrated in FIG. 2, is first described to provide the reader with an exemplary context for method 100. It is noted that this scenario is described in detail in U.S. Non provisional patent application Ser. No. 15/467,111, filed on Mar. 23, 2017, and titled "METHODS OF SUBTRACTIVELY MANUFACTURING A PLURALITY OF DISCRETE OBJECTS FROM A SINGLE WORKPIECE USING A REMOVABLE FIXATING MATERIAL," which is incorporated herein by reference for all of its teachings on double-sided processing techniques. The configuration of slab 200 and its composition are merely exemplary and should in no way be considered limiting. It is noted that throughout FIGS. 3A to 7, each and every occurrence of elements such as certain valleys, spaces, and interconnecting portions are not labeled for convenience and to avoid cluttering the figures. However, at least some are labeled, and those skilled in the art will readily understand where these elements exist though they are unlabeled.

Figure 3A:
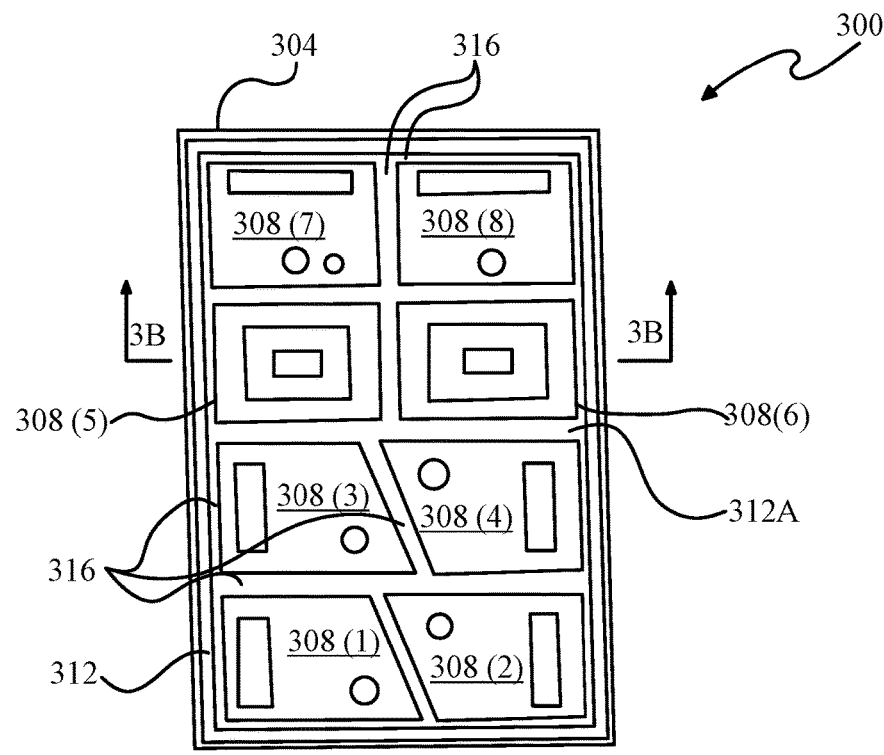
FIG. 3A is a plan view of a computer model of a workpiece composed of a computer model of a temporary support frame, selected in coordination with the rectangular slab of FIG. 2, and multiple computer models of several types of objects to be formed from the rectangular slab.
Figure 3B:
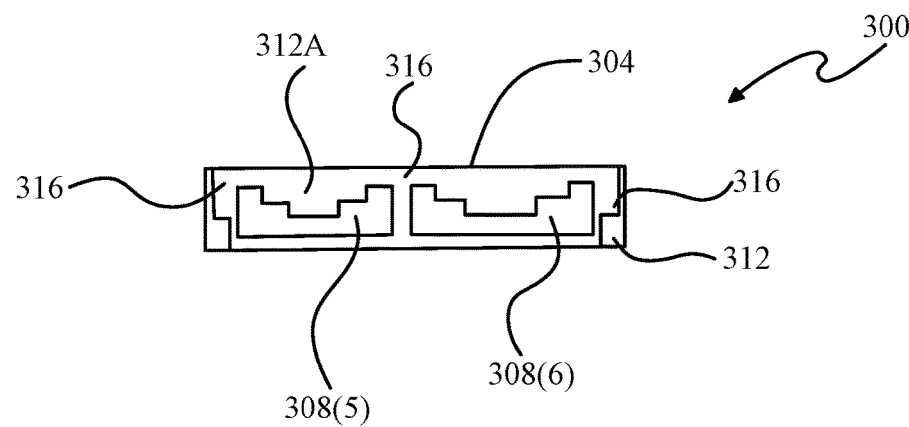
FIG. 3B is a cross-sectional view as taken along line 3B-3B of FIG. 3A.

FIGS. 3A to 7 illustrate scenario involving a temporary support frame, that is effectively formed from the same body of material from which the objects at issue are subtractively manufactured. Referring first to FIGS. 3A and 3B, a workpiece model 300 of a workpiece 400 (FIGS. 4A and 4B) that includes a slab computer model 304, here of slab 200 of FIG. 2, a plurality of object computer models 308(1) to 308(8) representing discrete objects 700(1) to 700(8) (FIG. 7) to be created from workpiece 400, and a frame computer model 312 of a temporary support frame 704 (FIG. 7) that will ultimately be formed by machining along with discrete object 700(1) to 700(8) in this example. Object computer models 308(1) to 308(8) and frame computer model 304 are located relative to one another to form inter-structure regions 316 that will become spaces that separate discrete objects 700(1) to 700(8) and temporary support frame 704 (FIG. 7) after machining.

In one embodiment, a user may create workpiece model 300 using, for example, a workpiece-layout system made in accordance with the present disclosure that includes computer modeling software, such as CAM software, CAD software, or other software. Using the computer-modeling software, the user may locate, for example, via graphical representations on one or more graphical displays, object computer models 308(1) to 308(8) relative to frame computer model 312 to achieve the desired arrangement of the object computer models within the central through-opening 312A of the frame computer model. Depending on the workflow selected, the user may locate frame computer model 312 relative to slab computer model 304, or vice versa, before locating object computer models 308(1) to 308(8) relative to the frame computer model, or, alternatively, the user may locate the object computer models relative the frame computer model before locating the combination of the object and frame computer models relative to the slab computer model, or vice versa. It is noted that rectangular slab 200 of FIG. 2 can be used to make discrete objects 700(1) to 700(8) and temporary support frame 704 (FIG. 7) despite the discrete objects in stabilized workpiece 500 (FIGS. SA and SB) being close to the edges of the rectangular slab by, for example, reducing the spacing between adjacent ones of described objects (and corresponding object computer models 308(1) to 308(8). It is noted that this process may be partially or fully automated without a user and that a person of skill in the art after reading this disclosure in its entirety will readily appreciate the myriad of examples in which an automated or partially automated method may proceed.

Figure 4A:
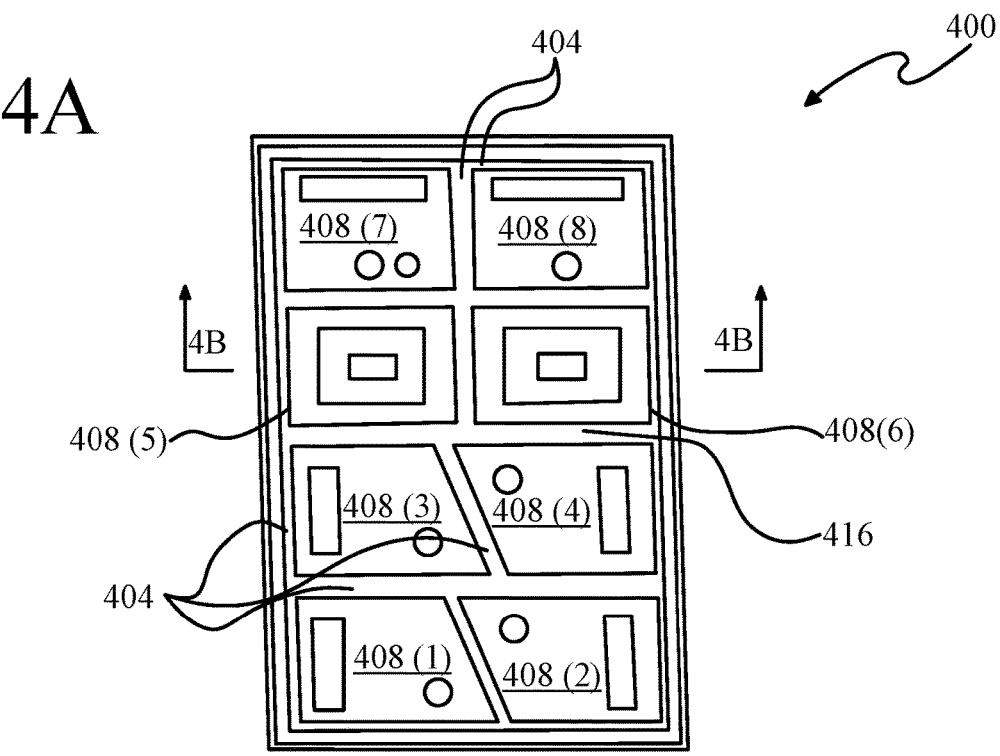
FIG. 4A is a plan view of the first side of the workpiece of the model of FIGS. 3A and 3B after forming valleys in the workpiece that partially define the plurality of discrete objects.
Figure 4B:
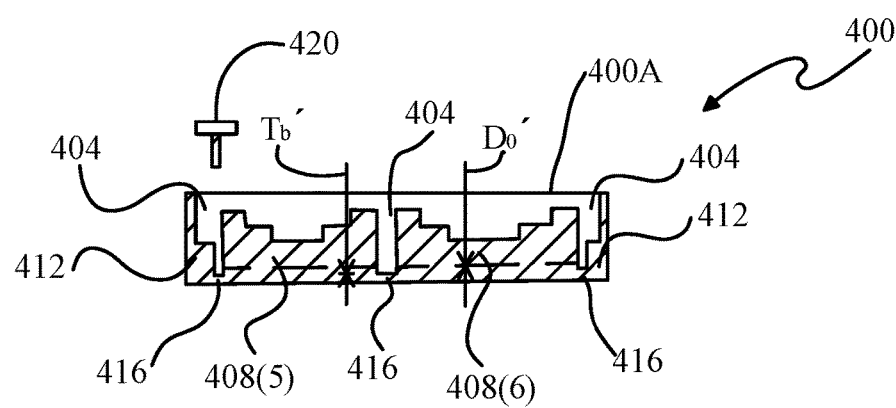
FIG. 4B is a cross-sectional view as taken along line 4B-4B of FIG. 4A.

FIGS. 4A and 4B illustrate the state of workpiece 400 after the subtractive manufacturing that occurs from the obverse side 400A of the workpiece. As seen in FIGS. 4A and 4B, material is removed from workpiece 400 to define valleys 404 between partially formed objects 408(1) to 408(8) and partially formed frame 412 in the workpiece that correspond to portions of inter-structure regions 316 between object computer models 308(1) to 308(8) and frame computer model 312 as defined in workpiece model 300 of FIGS. 3A and 3B. In the example shown, valleys 404 do not extend all the way through the thickness of workpiece 400 at any location. Consequently, valleys 404 define interconnecting portions, here continuous bridging 416, between partially formed objects 408(1) to 408(8) and between the partially formed objects and partially formed frame 412. In the example shown, the thickness, Tb', of continuous bridging 416 is equal to or slightly less than the minimum depth, Do', that must be removed from the reverse side of workpiece 400, i.e., the side of the workpiece opposite from the side (i.e., obverse side) containing valleys 404. Setting the thickness Tb' of continuous bridging 416 (or partial bridging in other embodiments) in this way can provide for simplified material removal. Those skilled in the art will readily appreciate that workpiece computer model 400 and/or any subsequently created CAM model(s) may include information for forming valleys 404 and corresponding continuous bridging 416. In the example shown, the subtractive manufacturing process used for removing material is a rotary milling process performed using a rotary milling machine, as represented by rotary milling tool 420. In other embodiments, one more other subtractive manufacturing processes may be used to form valleys 404.

Figure 5A:
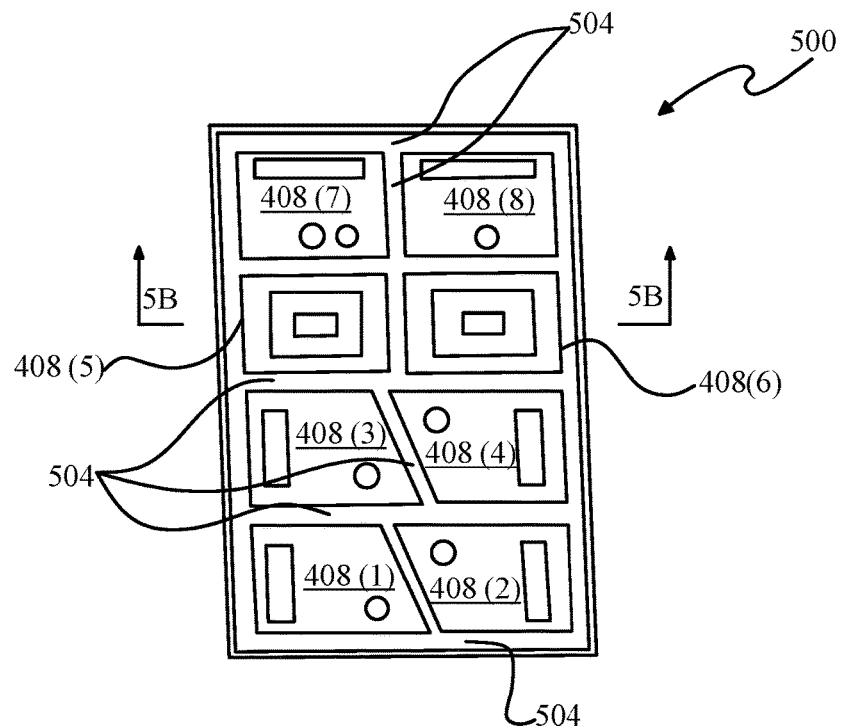
FIG. 5A is a plan view of the workpiece of FIGS. 4A and 4B having a removable fixating material installed to stabilize the workpiece during subsequent manufacturing operations.
Figure 5B:
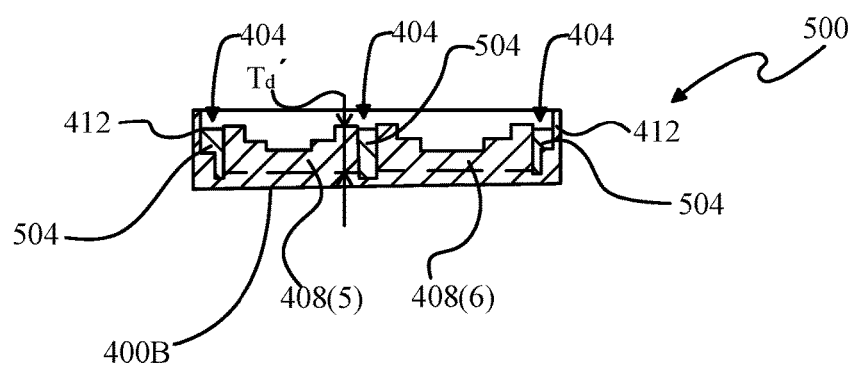
FIG. 5B is a cross-sectional view as taken along line 5B-5B of FIG. 5A.

FIGS. 5A and 5B illustrate installing a temporary and removable fixating material 504 in workpiece 400 of FIGS. 4A and 4B to create stabilized workpiece 500. Since partially formed frame 412 is integral with workpiece 400, removable fixating material 504 need only be installed into valleys 404 to an appropriate depth, which may be less than, equal to, or greater than the greatest thickness, Td, of workpiece 400 remaining after subtractive manufacturing. That said, in this example, removable fixating material 504 is installed to a depth less than the greatest thickness Td of workpiece 400. Once removable fixating material 504 has sufficiently hardened, stabilized workpiece 500 (i.e., workpiece 400 plus installed removable fixating material 504) may be ready for machining on its reverse side 400B.

Figure 6A:
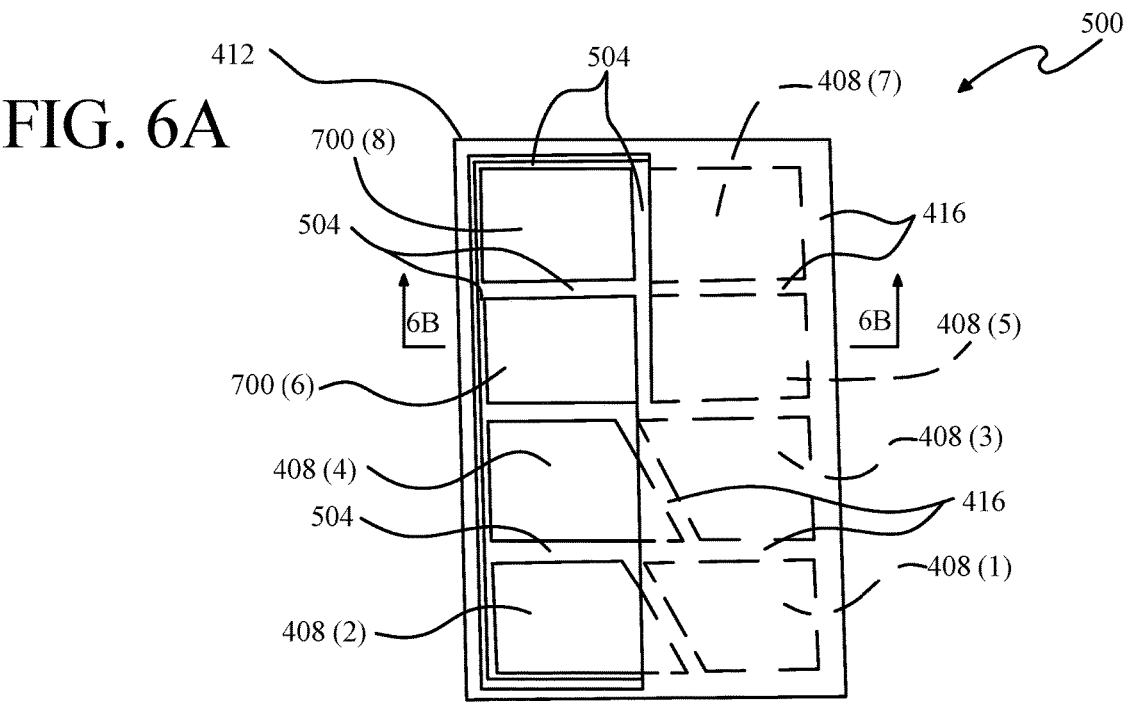
FIG. 6A is a plan view of the second side of the stabilized workpiece after removing some material from the second side of the stabilized workpiece so as to remove the interconnecting portions spanning between adjacent ones of partially formed objects in the stabilized workpiece.
Figure 6B:
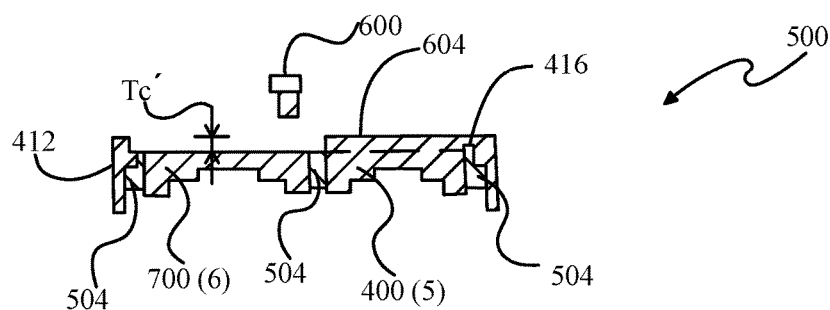
FIG. 6B is a cross-sectional view as taken along line 6B-6B of FIG. 6A.
Figure 7:
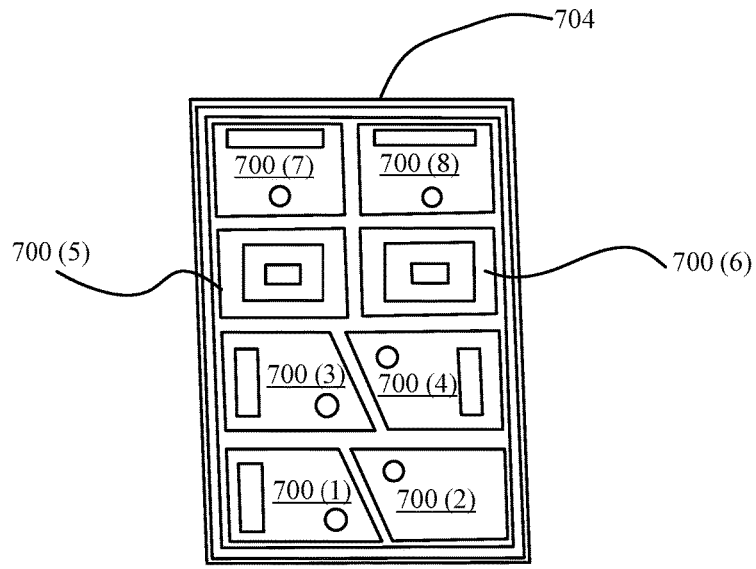
FIG. 7 is a plan view of the discrete objects after removing the removable fixating material from the stabilized workpiece of FIGS. 6A and 6B after removing all interconnecting portions.

FIG. 6A illustrates stabilized workpiece 500 partway through removal of the interconnecting portions, here continuous bridging 416, between partially formed objects 408(1) to 408(8) (only appropriate ones labeled) and partially formed frame 412 using one or more subtractive manufacturing processes. In this example, the process of removing continuous bridging 416 is a rotary-tool machining operation performed by a rotary milling tool 600 that, in this example, removes a "layer" 604 of constant thickness, Tc', across the entire reverse side of stabilized workpiece 500. As noted above, continuous bridging 416 can be removed in another manner as desired. However, removing such a constant-thickness layer can gain certain economies in the machining process. FIG. 6B illustrates that partially formed objects 408(1) to 408(8) (FIGS. 4A and 4B) and partially formed frame 412 are now, or will become when material removal is completed, discrete objects 700(1) to 700(8) (only appropriate ones labeled) and discrete temporary support frame 704 (FIG. 7) held together only by removable fixating material 504. In the example shown, portions of removable fixating material 504 adjacent to layer 604 are not machined away, but could be if desired. FIG. 7 illustrates stabilized workpiece 500 (FIGS. 5A and 5B) after removal of removable fixating material 504, thereby leaving only discrete objects 700(1) to 700(8) and temporary support frame 704, which can be used (such as in the second scenario described above), recycled, or discarded, as desired.

With the forgoing illustrative example of FIGS. 2 to 7 in mind for general context and referring again to FIG. 1, exemplary method 100 includes a step 105 at which a workpiece-layout system receives, a graphical representation of a temporary support frame that is to be machined from the body of material (or, again, "workpiece"), along with the discrete objects that are the subjects of the machining. The temporary support frame in this example is used as part of an object-stabilizing scheme for holding the objects and their partially machined precursors in place using a removable fixating material, such as a machinable wax. Briefly, in some embodiments the object-stabilizing scheme involves machining the workpiece from a first side to create a network of valleys that will ultimately be part of a network of through-openings that separate the objects from one another and from the temporary support frame, but that leave interconnecting portions at the bottoms of the valleys that will be removed in later machining from the opposite side of the workpiece. After machining the network of valleys, a removable fixating material is installed into the network of valleys and allowed to harden. The hardened removable fixating material stabilizes and holds the objects in place relative to each other and to the temporary support frame during machining of the opposite in which the interconnecting portions of the body of material are machined away to disconnect the objects from one another and from the temporary support frame.

The temporary support frame includes a central through-opening that, after machining the workpiece from its first and second sides to create the discrete objects and temporary support frame, contains the discrete objects. Coupling between the removable fixating material and the temporary support frame can be enhanced by providing one or more interlock features on and/or adjacent to the inner periphery of the temporary support frame that engage the removable fixating material in a manner that forms a mechanical interlock between the interlock feature(s) and the hardened removable fixating material. Examples of interlock features include grooves and bosses that are oriented in a direction that have a depth or height in a direction perpendicular to a plane lying on a first or second face of the workpiece on, respectively, its first or second side. In some embodiments in which the temporary support frame is rectangular in shape, it generally resembles a picture frame, with the central through-opening being the region defined by the inner perimeter of the frame and its thickness. Examples of temporary support frames are depicted in various figures of the attached drawings.

In some embodiments, the workpiece-layout system may include a temporary-support-frame library containing graphical representations for multiple temporary support frames of differing sizes and/or thicknesses, wherein the multiple temporary support frames are configured for specific bodies of materials. For example, a graphical representation of one temporary support frame may correspond to a stock piece of stainless steel that is 24.02"×18.02"×1" In this case, the temporary support frame may be 24"×18"×0.8" to account for, for example, aspects of the two-part machining of the first and second sides of the workpiece. As another example, a graphical representation for another temporary support frame may correspond to a stock piece of aluminum that is 36.02"×24.02"×3" and this temporary support frame may be 36"×24"×2.8" These examples are merely illustrative; fundamentally there is no limitation on the differing graphical representations of temporary support frames that can be provided in a temporary-support-frame library of the present disclosure.

If the workpiece-layout system includes a temporary-support-frame library containing two or more graphical representations of differing temporary support frames, a step prior to displaying a graphical representation of a temporary support frame at step 105 may be that the workpiece-layout system receives a selection of that graphical representation from the temporary-support-frame library. This selection may be accomplished in any one or more of a variety of ways, such as by user selection via a dialog box that displays either the multiple graphical representations of the differing temporary support frames or corresponding descriptors or filenames and allowing a user to select the desired one, allowing the user to drag and drop the desired graphical representation, or allowing the user to select the desired body of material and automatically selecting the corresponding graphical representation of the pertinent temporary support frame for the selected body of material, among others. In the case of the last-mentioned option, such selection of the body of material can also be enabled in any one or more of a variety of ways, including via a dialog box that displays either the multiple graphical representations of the differing available bodies of material or corresponding descriptors or filenames and allowing a user to select the desired one, among others. In embodiments of the workpiece-layout system not having an interactive temporary support frame library, the user may retrieve the graphical representation of the temporary support structure displayed at step 105 in any suitable manner, such as by receiving an identification of a computer-model file in an onscreen dialog box, dragging and dropping the graphical representation from one onscreen window to another onscreen window, copying and pasting the graphical representation from one onscreen window to another onscreen window, and any combination of these ways. Additionally or alternatively, this process may be fully automated or partially automated and a person of skill in the art after reading this disclosure in its entirety will readily appreciate the plurality of possibilities for automated or partially automated implementations of methods described in this disclosure. It is further noted that the selection of a temporary support frame may be related to the orientation of graphical representations of objects. For instance, if it is known that that the graphical representation of objects is of a certain thickness, then a support frame may be chosen to efficiently accommodate those objects based on the x/y footprint and z orientation of the objects or the number of parts desired to be included in a single temporary support frame. As noted, this process may be manual, fully automated or partially automated.

At step 110, the workpiece-layout system receives a selection of graphical representations of the plurality of object to be machined from the workpiece. The workpiece-layout system may receive the selection in any of a variety of way, including ways that are the same as or similar to ways known in conventional CAD software, such as SOLIDWORKS® CAD software, available from Dassault Systemes Americas, Waltham, Mass., among others. Examples of ways of receiving a selection of graphical representations of a plurality of objects to be machined include, but are not limited to, receiving an identification of one or more computer-model files in an onscreen dialog box, dragging and dropping one or more graphical representations from one onscreen window to another onscreen window that contains or will contain the representation of the temporary support frame, copying and pasting one or more graphical representations from one onscreen window to another onscreen window that contains or will contain the representation of the temporary support frame, and any combination of these ways. In some embodiments, the selected graphical representations of the objects to be machined may be displayed on the graphical display along with the graphical representation of the temporary support frame.

At step 115, the workpiece-layout system locates the graphical representations of the plurality of objects in the central through-opening of the graphical representation of the temporary support frame so that they are spaced from one another and from adjacent portions of the temporary support frame by one or more minimum distances that permits machining away material from in between immediately adjacent ones of the objects themselves and between various ones of the objects and the temporary support frame. In some embodiments, the locating of the graphical representations that occurs at step 115 typically results in the clustering of the graphical representations of the objects within the central through-opening of the graphical representation of the temporary support frame into one or more clusters.

The locating of the graphical representations of the objects at step 115 may be performed in any one or more of a variety of manners. For example, when the graphical representations of the object are displayed along with the graphical representation of the temporary support frame and the workpiece-layout system is so configured, the locating may be in response to a user's onscreen manipulation of those graphical representations, such as by dragging and dropping, snapping the representations to grid or other points, and keying in coordinates for reference points, among others. In another example, the workpiece-layout system may include a set of software instructions designed and configured to automatically perform the locating at step 115. For instance, and as described in more detail below relative to a detailed example, the CAMWorks software mentioned has a nesting feature that automatically nests, or locates, a plurality of graphical representations relative to one another in a manner that optimizes clustering of the objects to varying extents, depending on the shapes of the graphical representations and the nesting options selected. In an embodiment, it may be necessary to temporarily assume that objects of different thicknesses match the thickness of the frame when working with a third-party software, such as CAMWorks, for nesting purposes. Whether the graphical representations of objects are manually or automatically nested (including being partially automatically nested), the orientation of parts may depend on a number of factors including the ability to manufacture with as few set-ups as possible, stock size, tooling limitations, whether or not the fixating material will hold the parts to manufactured properly, or the amount of material removal required. It is further noted that object orientation may be used to align the bottom most surface, top most surface, and/or midplane of individual objects to a recess surface on the temporary support frame to leave material that may hold objects in place during a first machining operation.

Still viewing FIG. 1, at optional step 120 workpiece-layout system may generate a machine-control instruction set for machining the workpiece to create the multiple end-product objects desired to be created from the workpiece. The generated machine-control instruction set may contains the instructions for controlling the one or more pieces of numerical control (NC) machining equipment, such as one or more NC milling machines, to perform the machining on the workpiece to create the objects and the temporary support frame. The generating of the machine-control instruction set accounts for, among other things, 1) the graphical representations of the objects and the temporary support frame (including any interlock structure(s) for the removable fixating material, 2) the machining equipment, including any particular tool(s) used in the machining of the workpiece, 3) the actual dimensions of the body of material initially forming the workpiece, 4) any datum(s) provided to properly locate the workpiece relative to the machining equipment, and 5) separate machining steps for forming a network of valleys from an obverse side of the workpiece to accommodate removable fixating material and for removing interconnecting portions from the reverse side that connect the objects to one another and/or to the temporary support frame and/or the occupying structure(s).

As a simple example in which one single-ended CNC end mill is used for all of the milling on the obverse and reverse sides of the workpiece, the machine-control instruction set includes instructions for directing the cutting tool of the end mill along a first path on the obverse side of the workpiece that forms 1) the valleys that will receive the removable fixating material and define portions of the through-openings among the multiple objects that define the objects, inner portion(s) of the temporary support frame, and one or more portions of each occupying structure, 2) the interlock features on the inner periphery of the temporary support frame, including any occupying structure, if any, that modified the starting temporary support frame and on any island-type occupying structure, if any, and 3) any cavity or other surface feature, if any, one any one or more of the objects. Such a machine-control instruction set would also include instructions for directing the cutting tool (or a different cutting tool) of the end mill along a second path on the reverse side of the workpiece in which 1) the interconnecting portions defined by the valleys formed from the obverse side are removed, 2) any surfaces and/or surface features on the objects, if any, are machined.

As those skilled in the art will readily appreciate, the machine-control instruction set may be generated as a function of 1) the specific machining tool(s) (e.g., milling bit(s)) that will be used during the machining of the workpiece to create the multiple object as well as 2) the size of the body of material that becomes the workpiece. It is noted that the specific machining tool(s) have been at least partially accounted for in the process of defining the offsets for the objects and any occupying structures. The size of the workpiece is used to define where the machining equipment will actually be removing material and engaging the workpiece. Other inputs, such as type of material (e.g., to control machining speed), may also be used for generating the machine-control instruction set as needed or desired. The generation of the machine-control instruction set may be performed automatically, such as by intelligent CAM software (e.g., CAMWORKS® software available from Geometric Technologies, Inc., Scottsdale, Ariz.), performed semi-automatically with the assistance of a user (such as when the CAM software does not have intelligence on how to handle certain physical features), or under the complete control of a user.

Generating machine-control instruction set may include generating one or more instructions to direct a particular automated manufacturing device, including without limitation a CNC machine tool, an EDM machine, a cutting machine, or the like, to perform specific subtractive manufacturing steps. One or more instructions may include, as a non-limiting example, an instruction to select a particular endmill, to perform a particular cutting or milling operation, to perform a registration cut, or any other instruction that persons skilled in the art will recognize as instructions that may be used to direct a particular subtractive manufacturing device to perform a specific set of manufacturing steps. Generating machine-control instruction set may alternatively or additionally include transmitting to an automated manufacturing device, or a computing device coupled thereto, information for localized and machine-specific machine-control instruction generation. As a non-limiting example, a particular CNC machine tool or the like may have specific control specifications and a bespoke or proprietary machine-control generation module or program; generation of machine-control instruction set may include provision of information usable by such a program or module to generate machine-specific manufacturing steps according to such specific control specifications. As a non-limiting example, where an automated manufacturing device and/or a computing device coupled thereto is configured to produce machine-specific instructions from a computer model such as a CAD file, CAM file, or the like, generation of machine-control instruction set may include transmission of a computer model to the automated manufacturing device or computing device coupled thereto. In an embodiment, generation of machine-control instructions is accomplished by generating information for localized and machine-specific machine-control instruction generation; generating information for localized and machine-specific machine-control instructions may include, for instance, generation of a computer model from which such machine-specific instructions may be produced.

With continued reference to FIG. 1, and at optional step 125, workpiece-layout system may initiate manufacture of the plurality of objects as a function of the foregoing steps and the body of material. Initiation of manufacture may include performance of a first step in the removal of material from body of material as described above; first step may include a particular milling or cutting operation, such as the performance of a registration cut. First step may include location of body of material at an automated manufacturing device; location may include placement in a precise position and/or registration within a coordinate system used by automated manufacturing device to guide particular manufacturing steps. First step may include generation of a control instruction initiating manufacturing steps; generation of a control instruction may include transmission of a signal to initiate manufacture and/or transmission of any machine control instruction sets generated as described above, including without limitation transmission of information for localized and machine-specific machine-control instruction generation. Transmission may be direct or indirect; for instance, transmission may involve transmission to a remote device that relays transmission to an automated manufacturing device or computing device coupled thereto, or transmission to an auxiliary computing device or computer memory for transport to the automated manufacturing device and/or computing device coupled thereto.

Figure 8:
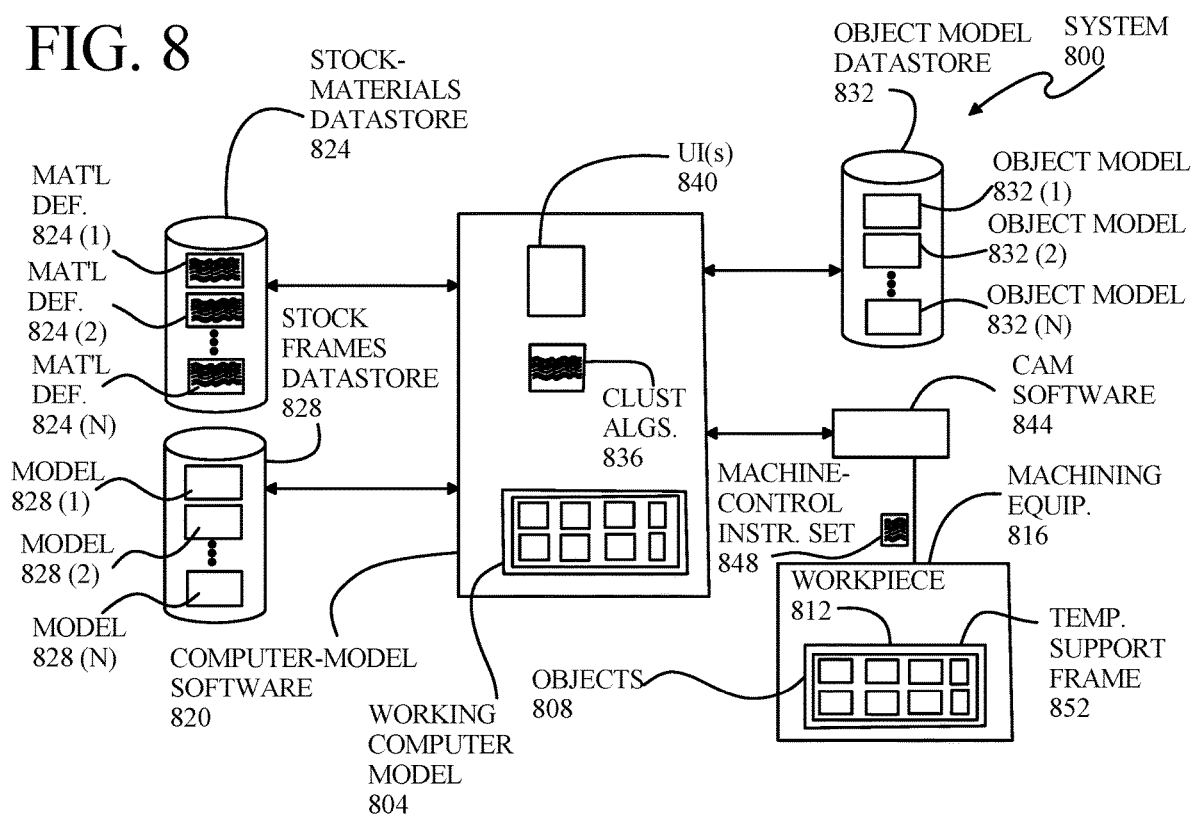
FIG. 8 is a high-level diagram illustrating a workpiece-layout system made in accordance with the present invention.

FIG. 8 illustrates an exemplary workpiece-layout system 800 that can perform methods of the present disclosure, including method 100 of FIG. 1, to create a workpiece computer model 804 for automatically machining a plurality of objects 808 from a single workpiece 812 using one or more pieces of machining equipment 816. In this example, workpiece-layout system 800 includes computer-modeling software 820, such as CAD software, that allows a user to create, build, modify, etc., computer models of various structures via graphical representations displayed to the use on one or more graphical displays and manipulated by the user using one or more computer input devices. An example of such software that can be part of computer-modeling software 820 is SOLIDWORKS® CAD software, but any of many others, can be used to provide three-dimensional (3D) modeling functionality. In some embodiments, a user can use computer-modeling software 820, for example, in a manner described above, to create workpiece computer model 804 "manually," i.e., using conventional drawing commands native to commercial off-the-shelf (COTS) computer modeling software. In some embodiments, computer-modeling software 820 can include COTS CAD software that is augmented with custom software, such as via one or more plugin software modules, that automates and/or otherwise assists the user in efficiently building a workpiece computer model, such as workpiece computer model 804. In some embodiments, computer-modeling software 820 can be entirely custom software build for the specific task of building workpiece computer models, such as workpiece computer model 804. Generally, the form of computer-modeling software 820 can be any suitable form that provides the requisite functionality.

Following are examples of customization that can be provided to computer-modeling software 820, for example, via one or more plugin modules and/or direct integration, and to workpiece-layout system 800 more generally, to enhance the user experience and/or increase the speed and ease of creating workpiece computer models, such as workpiece computer model 804. In some embodiments, for example, where a fabricator frequently makes object from a variety of stock bodies of material (e.g., sheets or slabs of stainless steel, aluminum, etc.), workpiece-layout system 800 may include a stock-materials datastore 824 and a corresponding stock-frames datastore 828 that contain, respectively, stock-material definitions 824(1) to 824(N) (e.g., sizes, material type, etc.) of bodies of material typically used and preconfigured frame computer models 828(1) to 828(N) of temporary support frames suitable for use with corresponding respective stock bodies of material. In this connection, computer-modeling software 820 may include a user interface (UI) designed and configured to allow a user to select a desired one of stock-material definitions 824(1) to 824(N) and/or a desired one of preconfigured frame computer models 828(1) to 828(N) for use in creating a particular workpiece computer model. When stock-materials datastore 824 and/or stock-frames datastore 828 are not provided, a user can import them into workpiece-layout system 800 as needed or create them as needed, for example, using computer-modeling software 800. Relatedly, workpiece-layout system 800 may also include an object-model datastore 832 that stores computer models 832(1) to 832(N) of objects to be made from workpieces modeled using the workpiece-layout system. In the absence of object-model datastore 832, computer models of objects to be made can be stored elsewhere and imported into workpiece-layout system 800 when needed and/or created using computer-modeling software 820.

As mentioned above in connection with method 100, computer-modeling software made in accordance with the present invention, such as computer-modeling software of FIG. 8, may include clustering algorithms 836 designed and configure to automatically cluster the object models within a selected temporary support frame in a manner that minimizes the amount of machining that needs to be performed, for example, by maximizing consolidation of the excess unoccupied regions into as few relatively large excess unoccupied regions as possible, to create the objects from the workpiece modeled using workpiece-layout system 800. Computer-modeling software 820 may also include any suitable UI(s) 840 that allow a user to implement clustering algorithms 836.

Clustering algorithms 836 and any corresponding functionalities and UIs, such as UI 840, may be implemented, for example, via one or more plugin modules or implemented within a core of the computer-modeling software itself. As those skilled in the art will readily appreciate, these and other customizations could be made to an extent that the only inputs needed are an indication of the computer models of the objects to be machined and an instruction to create the workpiece-computer model, and perhaps an indication of the material from which the objects are to be made if workpiece-layout system 800 is being used to create workpiece computer models for differing materials.

Workpiece layout system 800 may further include CAM software 844 designed and configured to generate, for each workpiece computer model 804, a machine-control instruction set 848 that controls machining equipment 816 during the machining of workpiece 812 to create plurality of objects 808 therefrom, as well as to create the temporary support frame 852 that is generally a remnant of the machining. CAM software 844 may include COTS CAM software, such as CAMWORKS®, CAM software, or any other suitable software that can utilize workpiece computer model 804 to generate machine-control instruction set 848, for example, in the manner described above in connection with method 100 of FIG. 1.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
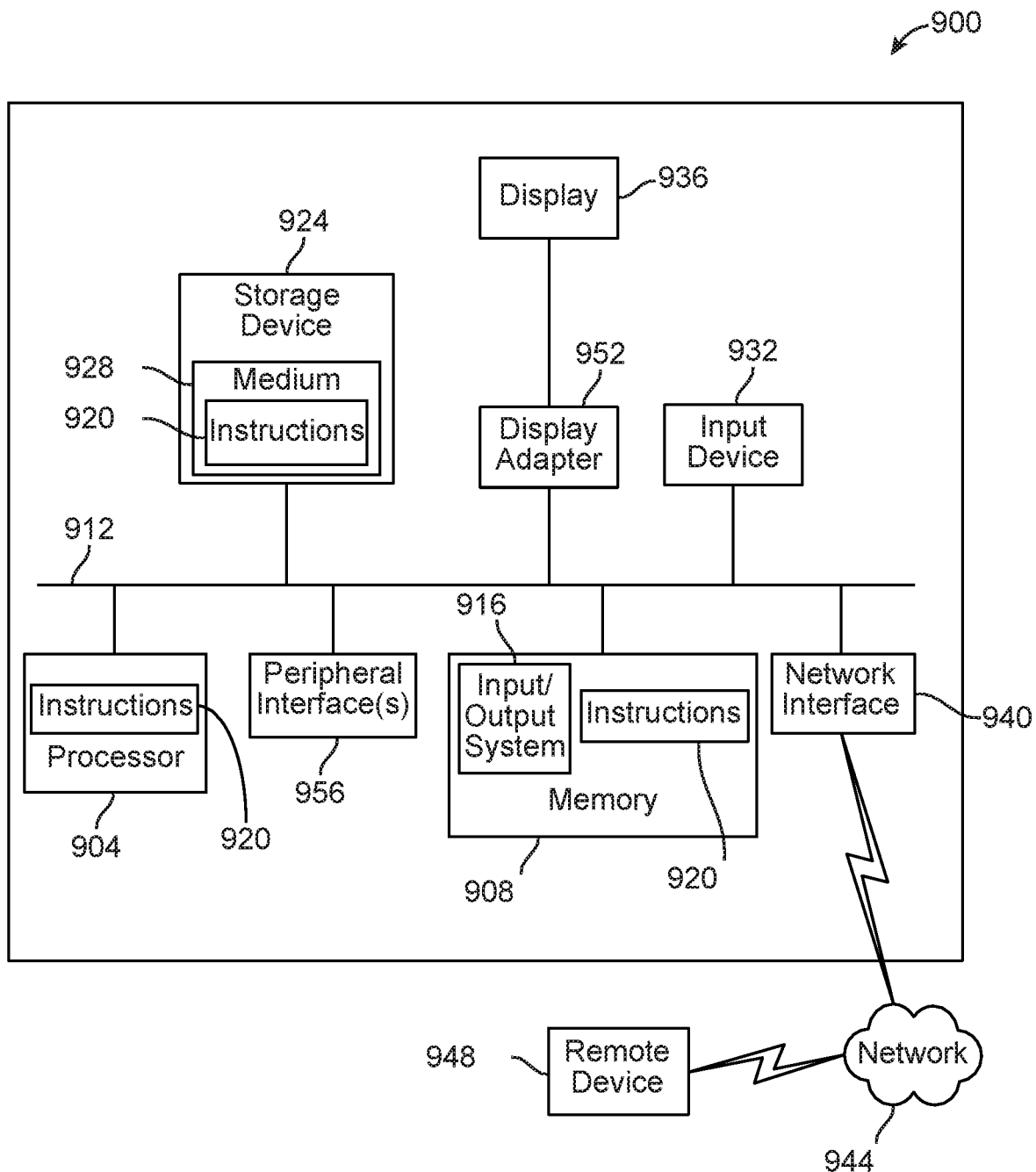
FIG. 9 is a high-level diagram illustrating a computing system suitable for use in implementing any one or more parts of a workpiece-layout system of the present disclosure, including the workpiece-layout system of FIG. 8.

FIG. 9 shows a diagrammatic representation of one embodiment of a computing device in the exemplary form of a computer system 900 within which a set of instructions for causing systems as described above to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Memory 908 may include various components (e.g., machine-readable media) including, but not limited to, a random access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of locating graphical representations of a plurality of objects in a central through opening, the method comprising:
   generating a workpiece computer model of a workpiece by:
   receiving a graphical representation of a temporary support frame with dimensions corresponding to dimensions of a body of material, the temporary support frame to be machined from the body of material, wherein the graphical representation of the temporary support frame includes:
   first and second faces spaced from one another; and
   a central through-opening for receiving graphical representations of computer models of the plurality of objects, the through-opening extending from the first face to the second face;
   receiving a selection of the graphical representations of the plurality of objects to be machined from the body of material;
   locating the graphical representations of the plurality of objects in the central through- opening so that the graphical representations of the plurality of objects are spaced from one another and from the graphical representation of the temporary support frame by a network of through-spaces so as to permit separating of the plurality of objects by machining of the body of material by machining equipment; and
   generating a machine-control instruction set as a function of the foregoing steps and the body of material, wherein generating the machine-control instruction set further comprises generating the machine-control instruction set based on the foregoing steps and the body of material so as to include machine-control instructions for controlling the machining equipment to:
   machine from a first side of the body of material a network of valleys corresponding to the network of through-spaces so as to leave interconnecting portions of the body of material that interconnect the plurality of objects with one another and with the temporary support frame; and
   machine away, from a second side of the body of material, the interconnecting portions so as to disconnect the plurality of objects from one another and from the temporary support frame;
   wherein the machine-control instructions include machine-control instructions for machining, from the first side of the body of material, the network of valleys so that the interconnecting portions have a thickness that is chosen as a function of the plurality of objects.

2. The method of claim 1, wherein:
   the graphical representation of the temporary support frame includes graphical representations of interlock features designed, configured, and located to interact with a fixating material during manufacturing for assisting with holding the plurality of objects in place relative to the temporary support frame; and
   the generating of the machine-control instruction set includes machine-control instructions for controlling the machining equipment to form the interlock features of the temporary support frame.

3. The method of claim 1, wherein the locating of the graphical representations of the plurality of objects in the central through-opening includes executing automated-nesting computer instructions that automatically position the graphical representations of the plurality of object within the central through-opening.

4. The method of claim 1, wherein the body of material has a lateral perimeter and the temporary support frame has a lateral perimeter that substantially matches the lateral perimeter of the body of material.

5. The method of claim 1, wherein the body of material has a thickness and the temporary support frame has a thickness that is chosen as a function of the body of material.

6. The method of claim 1, further comprising presenting to the user a user interface that allows the user to select the temporary support frame from among a predetermined set of temporary support frames.

7. The method of claim 1 further comprising initiating manufacture of the plurality of objects as a function of the foregoing steps and the body of material.

* * * * *